United States Patent
Sun et al.

(10) Patent No.: US 7,441,403 B2
(45) Date of Patent: Oct. 28, 2008

(54) METHOD AND SYSTEM FOR DETERMINING TEMPERATURE SET POINTS IN SYSTEMS HAVING PARTICULATE FILTERS WITH REGENERATION CAPABILITIES

(75) Inventors: Min Sun, Winsor (CA); Zornitza Pavlinova Pavlova-MacKinnon, Farmington Hills, MI (US); Kevin Dean Sisken, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 576 days.

(21) Appl. No.: 11/017,268

(22) Filed: Dec. 20, 2004

(65) Prior Publication Data

US 2006/0130468 A1  Jun. 22, 2006

(51) Int. Cl.
*F01N 3/00* (2006.01)
(52) U.S. Cl. ............... 60/295; 60/274; 60/297; 60/311
(58) Field of Classification Search .......... 60/274, 60/285, 286, 295, 297, 311
See application file for complete search history.

(56) References Cited

U.S. PATENT DOCUMENTS

| | | | |
|---|---|---|---|
| 4,677,823 A | 7/1987 | Hardy | |
| 4,719,751 A | 1/1988 | Kume et al. | |
| 4,730,455 A | 3/1988 | Pischinger et al. | |
| 4,747,264 A | 5/1988 | Santiago et al. | |
| 4,897,096 A | 1/1990 | Pischinger et al. | |
| 5,028,405 A | 7/1991 | Erdmannsdoerfer et al. | |
| 5,042,248 A | 8/1991 | Abthoff et al. | |
| 5,044,158 A | 9/1991 | Goerlich | |
| 5,067,973 A | 11/1991 | Pattas | |
| 5,551,971 A | 9/1996 | Chadderton et al. | |
| 5,557,923 A | 9/1996 | Bolt et al. | |
| 5,826,425 A | 10/1998 | Sebastiano et al. | |
| 5,956,944 A | 9/1999 | Dementhon et al. | |
| 6,176,896 B1 | 1/2001 | Dementhon et al. | |
| 6,304,815 B1 | 10/2001 | Moraal et al. | |
| 6,347,513 B2 | 2/2002 | Pfleger et al. | |
| 6,349,707 B1 | 2/2002 | Neumann et al. | |
| 6,374,812 B1 | 4/2002 | Wiese | |
| 6,397,584 B2 | 6/2002 | Salvat et al. | |
| 6,574,956 B1 | 6/2003 | Moraal et al. | |
| 6,594,990 B2* | 7/2003 | Kuenstler et al. | ............. 60/295 |
| 6,615,577 B2 | 9/2003 | Meyer et al. | |
| 6,615,580 B1 | 9/2003 | Khair et al. | |
| 6,622,480 B2 | 9/2003 | Tashiro et al. | |
| 6,632,764 B2 | 10/2003 | Druckhammer et al. | |
| 6,666,020 B2 | 12/2003 | Tonetti et al. | |
| 6,698,192 B2 | 3/2004 | Ootake | |
| 6,708,487 B2 | 3/2004 | Morimoto et al. | |
| 6,722,120 B2 | 4/2004 | Plote | |
| 6,735,941 B2 | 5/2004 | Saito et al. | |
| 6,742,328 B2 | 6/2004 | Webb et al. | |
| 6,742,331 B2 | 6/2004 | Minami | |
| 6,756,904 B2 | 6/2004 | Kinugawa et al. | |
| 6,758,039 B2 | 7/2004 | Kuboshima et al. | |
| 6,769,246 B2 | 8/2004 | Strohmaier et al. | |

(Continued)

*Primary Examiner*—Thomas Denion
*Assistant Examiner*—Diem Tran
(74) *Attorney, Agent, or Firm*—Brooks Kushman P.C.

(57) ABSTRACT

Method, system, and controller for determining a temperature set point for use in controlling regeneration of a particulate filter. The method, system, and controller being applicable in systems having an engine which emits exhaust gases having particulates which are captured by the particulate filter.

11 Claims, 2 Drawing Sheets

U.S. PATENT DOCUMENTS

| | | |
|---|---|---|
| 6,862,927 B2 * | 3/2005 | Craig et al. .................. 73/118.1 |
| 6,904,752 B2 * | 6/2005 | Foster et al. ................... 60/295 |
| 2001/0010152 A1 | 8/2001 | Tallec et al. |
| 2002/0033017 A1 | 3/2002 | Bruggemann et al. |
| 2002/0112472 A1 | 8/2002 | Tashiro et al. |
| 2002/0128146 A1 | 9/2002 | Druckhammer et al. |
| 2002/0157383 A1 | 10/2002 | Bouchez et al. |
| 2002/0178922 A1 | 12/2002 | Ohno et al. |
| 2002/0189235 A1 | 12/2002 | Meyer et al. |
| 2002/0194843 A1 | 12/2002 | Ootake |
| 2003/0029427 A1 | 2/2003 | Esteghlal |
| 2003/0033800 A1 | 2/2003 | Tonetti et al. |
| 2003/0089102 A1 | 5/2003 | Colignon et al. |
| 2003/0089103 A1 | 5/2003 | Hahn et al. |
| 2003/0106303 A1 | 6/2003 | Plote |
| 2003/0106308 A1 | 6/2003 | Gabe et al. |
| 2003/0115858 A1 | 6/2003 | Hahn et al. |
| 2003/0124031 A1 | 7/2003 | Dionnet et al. |
| 2003/0126858 A1 | 7/2003 | Strohmaier et al. |
| 2003/0136117 A1 | 7/2003 | Megas |
| 2003/0140623 A1 | 7/2003 | Ootake |
| 2003/0145581 A1 | 8/2003 | Tashiro et al. |
| 2003/0145582 A1 | 8/2003 | Bunting et al. |
| 2003/0182936 A1 | 10/2003 | Kitahara |
| 2003/0188518 A1 | 10/2003 | Itoyama et al. |
| 2003/0188527 A1 | 10/2003 | Patterson et al. |
| 2003/0200745 A1 | 10/2003 | van Nieuwstadt et al. |
| 2003/0200746 A1 | 10/2003 | Saito et al. |
| 2003/0209010 A1 | 11/2003 | Arnold |
| 2003/0213235 A1 | 11/2003 | Kitahara et al. |
| 2003/0221421 A1 | 12/2003 | Gui et al. |
| 2003/0221423 A1 | 12/2003 | Kosaka et al. |
| 2003/0230060 A1 | 12/2003 | Yahata et al. |
| 2003/0230076 A1 | 12/2003 | Kwon |
| 2003/0230077 A1 | 12/2003 | Kuboshima et al. |
| 2003/0230078 A1 | 12/2003 | Yahata et al. |
| 2003/0230079 A1 | 12/2003 | Kuboshima et al. |
| 2004/0000139 A1 | 1/2004 | Kawashima et al. |
| 2004/0011030 A1 | 1/2004 | Braun et al. |
| 2004/0020194 A1 | 2/2004 | Nishimura et al. |
| 2004/0031262 A1 | 2/2004 | Gui et al. |
| 2004/0055279 A1 | 3/2004 | Plote et al. |
| 2004/0074225 A1 | 4/2004 | Schaller et al. |
| 2004/0098977 A1 | 5/2004 | Kupe et al. |
| 2004/0098979 A1 | 5/2004 | Hammerle et al. |
| 2004/0103648 A1 | 6/2004 | Opris et al. |
| 2004/0103654 A1 | 6/2004 | Ohtake et al. |
| 2004/0134187 A1 | 7/2004 | Inoue et al. |
| 2004/0139729 A1 | 7/2004 | Taylor, III et al. |
| 2004/0139733 A1 | 7/2004 | Koga et al. |
| 2004/0144069 A1 | 7/2004 | Gabe et al. |
| 2004/0144083 A1 | 7/2004 | Ament |
| 2004/0144087 A1 | 7/2004 | Kondou et al. |
| 2004/0159097 A1 | 8/2004 | Uematsu et al. |
| 2004/0172935 A1 | 9/2004 | Otake et al. |
| 2005/0086929 A1 | 4/2005 | Nieuwstadt et al. |
| 2005/0150212 A1 | 7/2005 | Pfaeffle et al. |
| 2005/0284131 A1 | 12/2005 | Forthmann et al. |

* cited by examiner

METHOD AND SYSTEM FOR DETERMINING TEMPERATURE SET POINTS IN SYSTEMS HAVING PARTICULATE FILTERS WITH REGENERATION CAPABILITIES

BACKGROUND OF THE INVENTION

1. Field of the Invention

The present invention relates to systems and methods for determining temperature set points in systems having particulate filters with regeneration capabilities.

2. Background Art

A particulate filter is a device for capturing particulates emitted in exhaust gases from a combustion engine. In some systems employing a particulate filter, it may be desired to oxidize or burn the capture particulates in a process commonly referred to as regeneration. The regeneration of the particulates is dependent on temperatures at the particulate filter, which may be influence by exhaust gas fuel levels and exhaust gas temperatures.

Accordingly, a need exists to control exhaust gas fuel levels and exhaust gas temperatures at the particulate filter so as to facilitate regeneration of particulates captured with the particulate filter.

SUMMARY OF THE INVENTION

One non-limiting aspect of the present invention relates to determining a particulate filter temperature set point (Tset) value for a particulate filter. The Tset value, in general, specifies desired temperatures at a particulate filter which are suitable for regeneration of particulates captured therein during a regeneration process wherein the temperatures at the particulate filter are raised to the Tset value so as to instigate regeneration.

In accordance with one non-limiting aspect of the invention, a controller or other device may be configured to determine the Tset value and to facilitate regeneration as a function thereof, such as by controlling system operations to raise temperatures at the particulate filter to those specified by the Tset value, such as by controlling exhaust gas temperatures, exhaust gas fuel levels, and the like.

In accordance with one non-limiting aspect of the present invention, the Tset value is determined as a function of a critical temperature (Tc) value and a temperature adjustment (Ta) value for the particulate filter. In one non-limiting aspect of the present invention, the Tc value may correspond with a maximum temperature to which the filter may be desirably exposed during regeneration before risking heat damage and the Ta value may reflect thermal inertia of the filter during regeneration such that the Tset value takes into consideration the critical temperature of the particulate filter as well as its thermal inertia.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
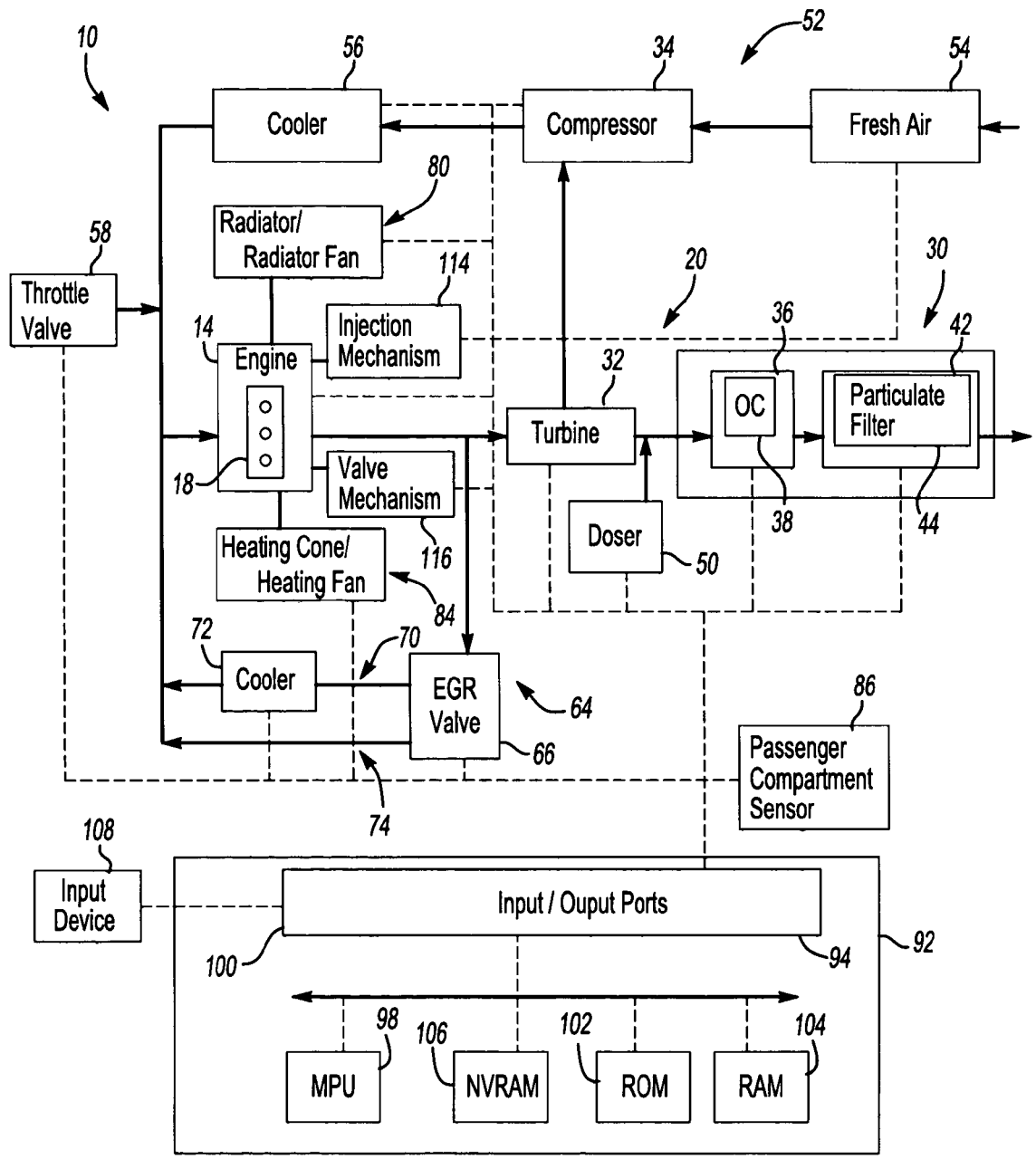
FIG. 1 a system in accordance with one non-limiting aspect of the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with an spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbocompound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller is preferably configured for determining a temperature associated with regeneration of the particulate filter 44. In more detail, the controller 92 may be configured to assess various operating conditions and other factors associated with regeneration of the particulate filter 44 and to select a corresponding temperature value. In accordance with one non-limiting aspect of the present invention, the corresponding temperature value may be referred to as a temperature set point (Tset) value.

In more detail, regeneration relates to a process whereby the particulates captured by the particulate filter 44 are oxidized or otherwise burned if temperatures at the particulate filter 44 are sufficient to combust the capture particulates. The Tset value may be correlated with one or more of the operating parameters influencing temperatures at the particulate filter 44, such as exhaust gas temperatures and/or exhaust gas fuel levels, so as to control the temperatures at the particulate filter 44 to correspond with those associated with regeneration. The disposal of the particulates in this manner may be advantageous to prevent clogging and filling of the particulate filter so that the exhaust gases may pass therethrough with minimal restriction and yet permit additional particulates to be collected.

The determination of the Tset value is critical to the regeneration process as improper regeneration may occur if the Tset value is too low and heat damage may occur to the particulate filter 44 if the Tset value is too high. Moreover, the determination of the Tset value is further important to adjusting regeneration according to varying operating and thermal conditions experienced by the particulate filter while at the same time maximizing oxidation rates and minimizing under and over heating of the particulate filter 44.

Figure 2:
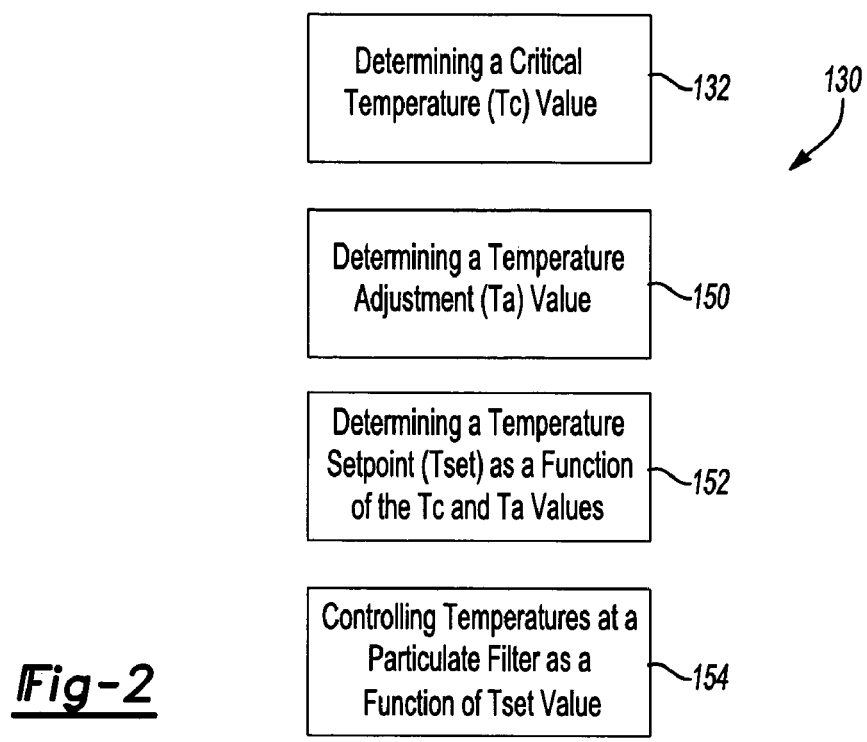
FIG. 2 illustrates a flowchart of a method for determining a temperature set point value in accordance with one non-limiting aspect of the present invention.

FIG. 2 illustrates a flowchart 130 of a method for determining the Tset value in accordance with one aspect of the present invention. The method is preferably executed according to software included on a controller or inputted thereto. Similarly, however, the method may be executed with other logic and other controllers, such as a regeneration system controller or the like.

Block 132 relates to determining a critical temperature (Tc) value for a particulate filter. The Tc value generally corresponds with a maximum temperature to which the particulate filter may be desirably exposed during regeneration before risking heat damage. The Tc value is therefore dependent on the material and physical properties of the particulate filter, such as its size, geometry, material properties, and the like, and the flow and composition of exhaust gases through the particulate filter canister. As such, the determination of the Tc value is application dependent and may include any number of variables.

In accordance with one aspect of the present invention, the Tc value is determined as a function of soot accumulation of the filter, exhaust space velocity through the particulate canister, exhaust gas oxygen concentration, exhaust gas heat capacity, exhaust gas mass flow through the particulate filter canister, and thermal resistance of the particulate filter. The functional relationship of these variables may be integrated into any number of algorithms, logic and other modeling applications. In accordance with one aspect of the present invention, a controller preferably includes a Tc value lookup table which correlates Tc values according to a first ratio and a second ratio wherein the first ratio is characterized by soot accumulation of the filter and exhaust space velocity through a particulate canister and the second ratio is characterized by exhaust gas oxygen concentration and thermal characteristics of the filter.

Figure 3:
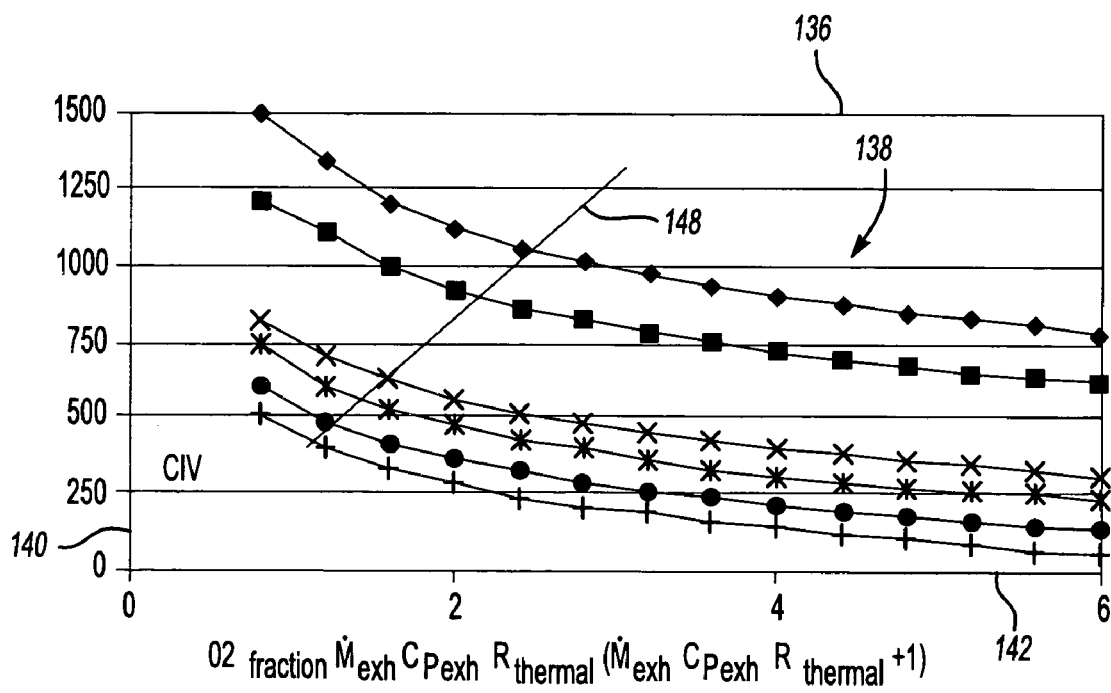
FIG. 3 illustrates a graph of a number of C/V curves in accordance with one non-limiting aspect of the present invention.

In more detail, the Tc value lookup table may include variables provided accordingly to a number of propriety curves used for modeling the Tc value as a function of operation characteristics of the particulate filter and the forces acting thereon. FIG. 3 illustrates a graph 136 having a number of C/V curves, generally referred to with reference numeral 138, wherein V is exhaust space velocity through the particulate filter canister and C is soot mass accumulation of the particulate filter.

As shown in FIG. 3, a vertical axis 140 includes Tc values defined according to degrees Celsius (° C.) and a horizontal axis 142 is defined according to the following formula:

$$O2_{fraction} \dot{M}_{exh} C_{Pexh} R_{thermal} (\dot{M}_{exh} C_{Pexh} R_{thermal} + 1)$$

wherein $O2_{fraction}$ is oxygen concentration of the exhaust gas at an inlet of a particulate canister, $\dot{M}_{exh}$ is mass flow rate of the exhaust gases, $C_{Pexh}$ is heat capacity of the exhaust gases, and $R_{thermal}$ is thermal resistance of the particulate filter.

The curves shown in FIG. 3 are only exemplary and are not intended to limit the scope and contemplation of the present invention. In general, however, the curves do accurately indicate that as the C/V ratio increase, as shown with line 148, the Tc value decreases when all other parameters are held the same, which can occur if increasing soot accumulation outpaces corresponding increases in exhaust space velocity, if increasing exhaust space velocity outpaces increases in soot accumulation, and/or for other reasons. This is done in accordance with one non-limiting aspect of the present invention desiring to limit oxidation rates of the particulate filter under high combustion conditions, such as when soot levels are high and/or when exhaust flow rates through the particulate canister are low, as high soot levels may lead to burn rates that increase faster than they can be controlled and low flow rates may limit the ability of the particulate filter to dispense the heat generate during oxidation. In each of these conditions, it is desirable to limit the Tc value so that the likelihood of heat damage to the particulate filter is minimized.

In one non-limiting aspect of the present invention, a decreasing value of Tc is determined if oxygen concentration in the exhaust gases increases without compensatory changes of the other variables, as higher oxygen concentration may lead to higher temperatures and uncontrolled regeneration. However, the opposite is true if oxygen concentration decreases such that the Tc value may be increased as it is less likely the oxidation caused by the low oxygen concentration levels is likely to lead to uncontrolled regeneration.

In one non-limiting aspect of the present invention, a decreasing value of Tc is determined if the soot accumulation increases without compensatory changes of the other variables, as higher soot levels may lead to higher temperatures and uncontrolled regeneration. However, the opposite is true if soot levels decreases such that the Tc value may be increased as it is less likely the lower levels of soot will lead to uncontrolled regeneration.

In one non-limiting aspect of the present invention, a decreasing value of Tc is determined if the space velocity increases without compensatory changes of the other variables, as greater space velocity distributes heat away from the particulate filter, which allows it to regenerate at higher temperatures before uncontrolled regeneration is likely. However, the opposite is true if space velocity decreases such that the Tc value may be decreased as there is less mass flow to dissipate the regeneration heat.

Block 150 relates determining a temperature adjustment (Ta) value for the particulate filter. In accordance with one aspect of the present invention, the Ta value is a parameter representative of a thermal inertia of the particulate filter as it undergoes regeneration. As described below in more detail, the ability to consider thermal inertia allows the present invention to further adjust the Tc value according to the operating and material characteristics and properties of the particulate filter, thereby permitting maximum temperatures during regeneration without risking damage to the particulate filter or uncontrolled regeneration. This may be advantageous for quick regeneration cycles and to limit other draws on the system that may be needed to raise exhaust gas temperatures.

Advantageously, such adjustability permits the Tc value to be increased and decreased as a function of thermal inertia. For example, if the thermal inertia is less than a thermal inertia threshold, then the particulate filter is heating up a slower than a desirable pace such that the Tset value may be increased above the Tc value as the low thermal inertia of the particulate filter is unlikely to lead to uncontrolled regeneration. Likewise, if the thermal inertia is greater than the thermal inertia threshold, then the particulate filter is heating up fast than desired such that the Tset value should be decreased below the Tc value as the high thermal inertia may lead to uncontrolled regeneration and potential filter damage.

In accordance with one aspect of the present invention, the Ta value is determined according to the following formula:

$$\frac{1}{\dot{M}_{exh} Cp_{exh} R_{thermal}} (T_i - Tf)$$

wherein $R_{thermal}$ is thermal resistance of the filter, $C_{Pexh}$ is exhaust gas heat capacity, $M_{exh}$ is exhaust gas mass flow, $T_i$ is exhaust gas temperature at an inlet through which the exhaust gases enter a particulate canister, and $T_f$ is temperature of the particulate filter.

In accordance with one aspect of the present invention, the thermal inertia value is positive to indicate that the particulate filter may be exposed to temperatures above the Tc value if the temperature of the particulate filter (Tf) is greater than the exhaust gas temperature at the inlet to the particulate filter (Ti). Similarly, the thermal inertia value is negative to indicate that the particulate filter may be not exposed to temperatures above the Tc value if the temperature of the particulate filter (Tf) is less than the exhaust gas temperature at the inlet to the particulate filter (Ti).

Furthermore, the Ta may be filtered according to the thermal resistance of the filter (Rthermal), the exhaust gas heat capacity (Cpeh), and the exhaust gas mass flow rate (Mexh). This is done to limit the contribution of thermal inertia based on operating characteristics of the regeneration system and the particulate filter.

Block 152 relates to determining the Tset value as a function of the Tc value and the Ta value. As described above, the Tset value may be used to control operation of the engine and other components in the powertrain system to control the regeneration of the particulate filter. As such, and in accordance with one aspect of the present invention, the Tset value is proportional to the Tc value after it is adjusted according to the thermal inertia of the particulate filter, i.e. the Ta value.

In accordance with one aspect of the present invention, the Tset value is determined from the following formula:

$$Tset = T_c + Ta$$

Block 154 relates to controlling operation of the regeneration system to regenerate the particulate filter as a function of the Tset value. In accordance with one aspect of the present invention, the regeneration system is intended to include any of the features described above and is intended to cover all features which may contribute to controlling temperatures at the particulate filter canister or items in association therewith.

Accordingly, the present invention contemplates controlling any one or more of these features to control temperatures at the particulate filter to approximate the Tset value so as to facilitate regeneration of the particulate filter. For example, the exhaust gas temperatures may be controlled by: controlling a radiator fan to control load on the engine and thereby the exhaust gas temperatures emitted therefrom; controlling a number of unfueled cylinders in of the engine to control load on the fueled cylinders and thereby the exhaust gas temperatures of exhaust gases emitted therefrom; and controlling fuel injected to the particulate canister, such as from the doser or emitted directly from the engine through fuel injection timing control and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining a particulate filter temperature set point (Tset) value for a particulate filter, wherein the Tset value is used to control regeneration of particulates captured by the particulate filter, the method comprising:
   determining a critical temperature (Tc) value for the filter, the Tc value corresponding with a maximum temperature to which the filter may be desirably exposed during regeneration before risking heat damage;
   determining a temperature adjustment (Ta) value for the filter, the Ta value reflecting thermal inertia of the filter during regeneration;
   determining the Tset value as a function of the Tc and Ta values; and
   determining the Tc value as a function of filter geometries and filter material properties including:
      determining a decreasing value of Tc if oxygen concentration in the exhaust gases increases;
      determining an increasing value of Tc if oxygen concentration in the exhaust gases decreases;
      determining a decreasing value of Tc if the soot accumulation increases; and
      determining an increasing value of Tc if the soot accumulation decreases.

2. The method of claim 1 further comprising determining a decreasing value of Tc if the space velocity increases.

3. The method of claim 1 further comprising determining an increasing value of Tc if the space velocity decreases.

4. A method for determining a particulate filter temperature set point (Tset) value for a particulate filter, wherein the Tset value is used to control regeneration of particulates captured by the particulate filter, the method comprising:
   determining a critical temperature (Tc) value for the filter, the Tc value corresponding with a maximum temperature to which the filter may be desirably exposed during regeneration before risking heat damage;
   determining a temperature adjustment (Ta) value for the filter, the Ta value reflecting thermal inertia of the filter during regeneration;
   determining the Tset value as a function of the Tc and Ta values; and
   determining the Tc value from a Tc value lookup table which correlates Tc values according to a first ratio and a second ratio, the first ratio characterized by soot accumulation of the filter and exhaust space velocity through a particulate canister and the second ratio characterized by exhaust gas oxygen concentration and thermal characteristics of the filter.

5. The method of claim 4 wherein the first ratio is defined as C/V wherein V is exhaust space velocity and C is soot mass accumulation of the filter.

6. The method of claim 4 wherein the first ratio is defined as:

$$O2_{fraction} \dot{M}_{exh} C_{Pexh} R_{thermal} (\dot{M}_{exh} C_{Pexh} R_{thermal} + 1)$$

wherein $O2_{fraction}$ is oxygen concentration of the exhaust gas at an inlet of the particulate canister, $M_{exh}$ is mass flow rate of the exhaust gases, $C_{pexh}$ is heat capacity of the exhaust gases, and $R_{thermal}$ is thermal resistance of the filter.

7. A method for determining a particulate filter temperature set point (Tset) value for a particulate filter, wherein the Tset value is used to control regeneration of particulates captured by the particulate filter, the method comprising:
   determining a critical temperature (Tc) value for the filter, the Tc value corresponding with a maximum temperature to which the filter may be desirably exposed during regeneration before risking heat damage;
   determining a temperature adjustment (Ta) value for the filter, the Ta value reflecting thermal inertia of the filter during regeneration;
   determining the Tset value as a function of the Tc and Ta values; and
   determining the Ta value according to the following formula:

$$\frac{1}{\dot{M}_{exh} Cp_{exh} R_{thermal}} (T_i - T_f)$$

wherein, $R_{thermal}$ is thermal resistance of the filter, $C_{pexh}$ is exhaust gas heat capacity, $M_{exh}$ is exhaust gas mass flow, $T_i$ is exhaust gas temperature at an inlet through which the exhaust gases enter a particulate canister, and $T_f$ is temperature of the particulate filter.

8. A method for determining a particulate filter temperature set point (Tset) value for a particulate filter, wherein the Tset value is used to control regeneration of particulates captured by the particulate filter, the method comprising:
   determining a critical temperature (Tc) value for the filter, the Tc value corresponding with a maximum temperature to which the filter may be desirably exposed during regeneration before risking heat damage;
   determining a temperature adjustment (Ta) value for the filter, the Ta value reflecting thermal inertia of the filter during regeneration;
   determining the Tset value as a function of the Tc and Ta values comprising; and
   determining Tset to be greater than the Tc value if the Ta value indicates the thermal inertia of the filter is below a thermal inertia threshold, the thermal inertia threshold corresponding with a desired rate of temperature of increase for the filter.

9. The method of claim 8 wherein the Ta value indicates the filter rate of temperature change is below the thermal inertia threshold if a temperature at an inlet through which the exhaust gases flow into the particulate canister is less than a temperature of the filter.

10. A method for determining a particulate filter temperature set point (Tset) value for a particulate filter, wherein the Tset value is used to control regeneration of particulates captured by the particulate filter, the method comprising:
   determining a critical temperature (Tc) value for the filter, the Tc value corresponding with a maximum temperature to which the filter may be desirably exposed during regeneration before risking heat damage;
   determining a temperature adjustment (Ta) value for the filter, the Ta value reflecting thermal inertia of the filter during regeneration; and
   determining the Tset value as a function of the Tc and Ta values; and
   determining Tset to be less than the Tc value if the Ta value indicates the thermal inertia of the filter is greater than a thermal inertia threshold, the thermal inertia threshold corresponding with a desired rate of temperature of increase for the filter.

11. The method of claim 10 wherein the Ta value indicates the filter rate of temperature change is greater than the thermal inertia threshold if a temperature at an inlet through which the exhaust gases flow into the particulate canister is greater than a temperature of the filter.

* * * * *